United States Patent [19]
Yajima et al.

[11] Patent Number: 5,280,264
[45] Date of Patent: Jan. 18, 1994

[54] RESISTOR ELEMENT HAVING LEAD WIRE CONSISTING OF WIRE ROD AND COVERING ALLOY LAYER

[75] Inventors: Yasuhito Yajima; Fujio Ishiguro, both of Nagoya; Zenji Ishikawa, Anjo, all of Japan

[73] Assignee: NGK Insulators, Ltd., Japan

[21] Appl. No.: 929,107

[22] Filed: Aug. 13, 1992

[30] Foreign Application Priority Data

Aug. 21, 1991 [JP] Japan ............... 3-233965

[51] Int. Cl.$^5$ .............. H01C 3/04; H01C 1/02; H01C 1/14
[52] U.S. Cl. .................. 338/25; 338/53; 338/276; 338/302; 338/322
[58] Field of Search .......... 338/302, 34, 322, 306, 338/25, 53, 275, 276

[56] References Cited

U.S. PATENT DOCUMENTS

| | | |
|---|---|---|
| 3,626,348 | 12/1971 | Alten . |
| 3,975,307 | 8/1976 | Matsuo et al. . |
| 4,415,877 | 11/1983 | Takami et al. ............ 338/34 |
| 4,513,615 | 4/1985 | Sato et al. . |
| 4,758,814 | 7/1988 | Howng et al. . |
| 4,903,001 | 2/1990 | Kikuchi . |
| 5,168,256 | 12/1992 | Ishiguro et al. ............ 338/25 |
| 5,175,527 | 12/1992 | Ishiguro et al. ............ 338/25 |

FOREIGN PATENT DOCUMENTS

| | | |
|---|---|---|
| 0245092 | 11/1987 | European Pat. Off. . |
| 3832379 | 3/1990 | Fed. Rep. of Germany . |
| 4108514 | 9/1991 | Fed. Rep. of Germany . |
| 59-104523 | 6/1984 | Japan . |

*Primary Examiner*—Marvin M. Lateef
*Attorney, Agent, or Firm*—Parkhurst, Wendel & Rossi

[57] ABSTRACT

A resistor element for determining a parameter, including a ceramic support, an electrically resistive body formed on the ceramic support, at least one lead wire electrically connected to the electrically resistive body, and an adhesive containing platinum for securing the lead wire(s) to the ceramic support. Each lead wire includes a wire rod having a lower thermal conductivity than platinum, and a covering layer which covers the wire rod and is formed of an alloy including platinum as a major component.

14 Claims, 1 Drawing Sheet

RESISTOR ELEMENT HAVING LEAD WIRE CONSISTING OF WIRE ROD AND COVERING ALLOY LAYER

BACKGROUND OF THE INVENTION

1. Field of the Invention

The present invention relates in general to a resistor element, and more particularly to a resistor element which utilizes temperature dependence of an electrical resistance of an electrically resistive body, and which may be suitably used as a thermal flowmeter for measuring an amount or a flow rate or velocity of a fluid flowing in an internal combustion engine, for example.

2. Discussion of the Prior Art

There are known resistor elements of the above type having a cylindrical shape or a planar shape. FIG. 1 shows an example of cylindrical resistor element, which includes a ceramic tube 2 formed of alumina, for example, and having an outside diameter of about 0.5 mm, and a platinum thin layer 8 which is formed on an outer surface of the tube 2 and suitably patterned so as to have a desired resistance value. A pair of electrical conductors or leads 4 in the form of platinum wires having a diameter of about 0.2 mm are inserted into the opposite end portions of the ceramic tube 2, and are secured thereto by respective masses of platinum paste 6 serving as adhesives. The platinum layer 8 and leads 4 are electrically connected to each other, through the adhesive masses 6 provided at the opposite end portions of the ceramic tube 2.

Where the platinum wires are used as the leads as in the known resistor element, however, the heat generated by the resistor element tends to escape through the leads, rather than being dissipated into a fluid to be measured as intended. Accordingly, the temperature of the resistor element cannot be responsive to the amount or flow rate of the measurement fluid, resulting in reduced detecting accuracy of the element and a prolonged time required to start its detecting operation.

To solve the above problem, the leads may be formed of a material, such as 40Ni-Fe alloy, which has a lower thermal conductivity than platinum. In this case, however, the resistor element suffers from poor adhesion between the leads and the adhesive masses prepared from the platinum paste. When tensile stresses are exerted on the leads during installation of the resistor element by welding, therefore, the leads are likely to be pulled out of the adhesive masses, giving rise to clearances or cracks and accordingly reduced contact between the leads and adhesive masses. Consequently, the resistor element greatly suffers from a change in its electrical resistance. Since various thermal stresses are applied to the resistance element during its use, causing clearances or cracks between the adhesive masses and leads, the resistor element in use also suffers from a change in its electrical resistance.

To improve the adhesion between the leads and the adhesive masses prepared from the platinum paste, and to prevent oxidization of the leads during manufacture of the resistor element, it is proposed to employ a lead which consists of a wire rod or core formed of 40Ni-Fe alloy, and a platinum layer formed on the outer surface of the wire rod. While the thus formed lead is less likely to be pulled out of the adhesives, the thermal conductivity of the lead as a whole is undesirably increased because of the platinum layer, causing the same problem as encountered when the lead is formed solely of platinum.

SUMMARY OF THE INVENTION

It is therefore an object of the present invention to provide a resistor element having electrical leads secured thereto with platinum-based adhesives, which ensures significantly improved adhesion between the leads and the adhesives, while assuring an effectively reduced thermal conductivity of the leads.

The above object may be attained according to the principle of the present invention, which provides a resistor element for determining a parameter, comprising: a ceramic support; an electrically resistive body formed on the ceramic support; at least one lead wire electrically connected to the electrically resistive body, each lead wire comprising a wire rod having a lower thermal conductivity than platinum, and a covering layer which covers the wire rod and is formed of an alloy including platinum as a major component; and an adhesive containing platinum, for securing the lead wire(s) to the ceramic support.

To form the lead wire used in the resistor element of the present invention, the covering layer formed of an alloy including platinum as a major component is formed on the outer surface of the wire rod having a lower thermal conductivity than platinum. When the lead wire is secured to the ceramic support by using an adhesive prepared from a platinum paste, therefore, the adhesive is favorably combined with the covering layer of the lead wire, assuring an increased bonding strength therebetween. Accordingly, the lead wire is less likely to be pulled out of the adhesive even if compressive or tensile stresses are exerted on the lead wire. Thus, the resistor element of the invention is free from clearances or cracks between the lead wires and the adhesive masses, and thus assures stable electrical connection of the lead wires with the electrically resistive body, thereby favorably avoiding a change in the electrical resistance of the resistor element.

In the resistor element of the present invention, the wire rod of the lead wire is made of a metallic material having a lower thermal conductivity than platinum, while the covering layer formed on the outer surface of the wire rod is made of an alloy having a lower thermal conductivity than platinum. Thus, the thermal conductivity of the lead wire as a whole is significantly reduced, thereby effectively preventing heat escape through the lead wire to the outside. Accordingly, the present resistor element can be highly responsive to changes in the amount or flow velocity of a fluid to be measured, assuring improved detecting accuracy, a shortened time for staring its detecting operation and an improved operating response. The provision of the covering layer whose major component is platinum is also advantageous in avoiding oxidization of the lead wires during manufacture of the resistor element.

BRIEF DESCRIPTION OF THE DRAWINGS

The foregoing and other objects, features and advantages of the present invention will be better understood by reading the following detailed description of a presently preferred embodiment of the invention, when considered in connection with the accompanying drawings, in which.

DETAILED DESCRIPTION OF THE PREFERRED EMBODIMENT

Figure 1:
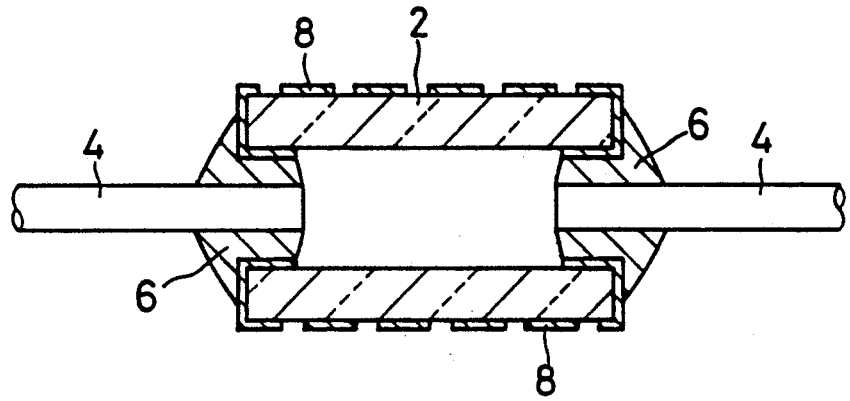
FIG. 1 is an elevational view in longitudinal cross section of an example of known resistor element.
Figure 2:
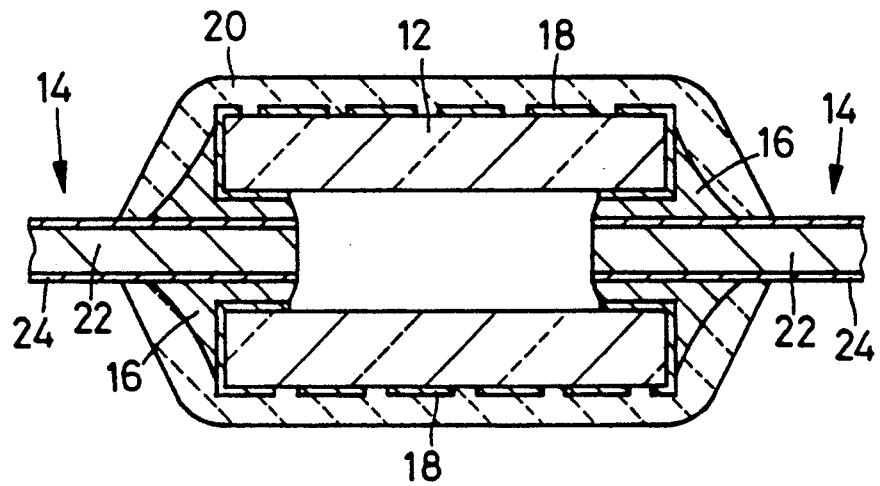
FIG. 2 is an elevational view in longitudinal cross section of one embodiment of a resistor element of the present invention.

Referring to the cross sectional view of FIG. 2, there is shown one embodiment of the resistor element of the present invention, which is similar in construction to the known resistor element of FIG. 1, except for electrical conductors or leads. This resistor element has a tubular ceramic support 12 formed of a known ceramic material such as alumina, and an electrically resistive body in the form of a resistor film 18 formed of platinum, for example, which is formed in a suitable pattern on the outer circumferential surface of the ceramic support 12. A pair of electrical conductors or lead wires 14, 14 are inserted suitable distances at their end portions in respective axial end portions of a central bore of the ceramic support 12, and secured to the support 12 by corresponding adhesive masses 16 containing platinum. The lead wires 14 and the resistor film 18 are electrically connected to each other, through the adhesive masses 16 provided in the axial end portions of the ceramic support 12. Further, the ceramic support 12 and other portions of the resistor element are covered with a protective layer 20 formed of glass, for example.

Each of the lead wires 14 consists of a wire rod 22, and a covering layer 24 formed on the outer surface of the wire rod 22. The wire rod 22 is formed of a metallic material having a lower thermal conductivity than platinum, while the covering layer 24 is formed of an alloy including platinum as a major component. While the metallic material used for the wire rod 22 of the lead wire 14 may be selected from pure metals, the wire rod 22 formed of an alloy is preferred in view of its melting point and thermal conductivity. Typical examples of the alloy used for the wire rod 22 include nichrome, tin bronze, MONEL (Ni-Cu alloy), INVAR (Fe-Ni-C-Cr alloy), stainless steel and Ni-Fe alloy, all of which exhibit a thermal conductivity not higher than one third of that of platinum. The MONEL may consist principally of 66 weight % of Ni, 29 weight % of Cu and 3 weight % of Al, while the INVAR may consist principally of 35.4 weight % of Ni, 0.06 weight % of C, 0.04 weight % of Cr, and the balance being Fe.

The material for the covering layer 24 formed on the outer surface of the wire rod 22 is not particularly limited but may be selected from alloys including as a major component platinum to which a selected metallic material may be added as an alloy component. Preferably, the alloy component may be selected from noble metals in view of heat resistance, in particular, from elements of the platinum group, such as ruthenium, rhodium, palladium, osmium and iridium. The content of the alloy component added to platinum is preferably held within a range of about 1-30% by weight in view of its corrosion resistance.

The covering layer 24 may be formed on the wire rod 22 by any of various known methods. For example, a rod member formed of a material for the wire rod 22 is fitted into a tubular member formed of a material for the covering layer 24, and the diameter of the thus obtained assembly is reduced by drawing so that the wire rod 22 is cladded with the covering layer 24. The formation of the covering layer 24 on the wire rod 22 may be otherwise achieved by plating or sputtering, for example. The thickness of the covering layer 24 is preferably held within a range of about 0.1–50 $\mu$m. The covering layer 24 having a thickness of less than 0.1 $\mu$m may suffer from pin-holes, tears or other damages.

While the platinum-based adhesives 16 for securing the lead wires 14 to the ceramic support 12 may be selected from any known materials for bonding a ceramic and a metal together, a platinum paste mixed with glass is generally employed to assure improved bonding strength. Of various kinds of glass, it is particularly desirable to use a crystallized glass, such as those including $ZnO.B_2O.SiO_2$, so as to effectively improve the bonding strength. With the lead wires 14 secured to the axial end portions of the ceramic support 12 by the platinum-based adhesive 16 as described above, the resistor element is subjected to heat treatment (or fired) so that the adhesives 16 are fused to thereby achieve firm bonding between the lead wires 14 and the ceramic support 12. Particularly, the covering layers 24 of the lead wires 14 and platinum particles contained in the adhesive 16 are fused and firmly combined with each other during the heat treatment, resulting in significantly increased bonding strength between the lead wires 14 and the ceramic support 12. Namely, the lead wires 14 are prevented with increased strength from being pulled out of the adhesive masses 16. Further, the lead wires 14 having the covering layers 24 thereon are advantageously protected against oxidization of the wire rods 22 during the heat treatment thereof.

The thus obtained resistor element is less likely to suffer from heat escape or transfer through the lead wires 14 to the outside, since the lead wire as a whole has an effectively lowered thermal conductivity. Further, the lead wire 14 with the covering layer 24 made principally of platinum adheres well to the platinum-based adhesive 16, assuring increased bonding strength between the lead wire 14 and the adhesive mass 16.

While the resistor element having the cylindrical ceramic support has been heretofore described, it is to be understood that the principle of the present invention may be equally applied to a resistor element having a planar ceramic support, for example. It is also to be understood that the present invention may be embodied with various changes, modifications and improvements which may occur to those skilled in the art, without departing from the scope of the invention.

EXAMPLES

To further clarify the concept of the present invention, there will be described in detail some specific examples of the resistor element of the invention. However, it is to be understood that the invention is not limited to the precise details of these examples, but may be otherwise embodied.

Some specimens (No. 1–No. 9) of resistor element as shown in FIG. 2 were prepared by using an alumina tube 12 as the ceramic support, which has an inside diameter of 0.2 mm, an outside diameter of 0.5 mm, and a length of 2 mm. A platinum film having a thickness of 0.4 $\mu$m was formed on the outer surface of the alumina tube 12 by sputtering, and then trimmed by a laser so as to obtain a patterned platinum layer 18 that is defined by a spiral groove formed in the platinum film. The thus obtained platinum layer 18 has a resistance value of 20$\Omega$. Then, a pair of lead wires 14 constructed as indicated in TABLE 1 were secured to the alumina tube 12 by respective platinum-based adhesive masses 16. The thus obtained assembly of the alumina tube 12, lead wires 14 and adhesive masses 16 was covered with glass and then fired, whereby each specimen of resistor element coated with a protective layer 20 was obtained. The wire rod 22 of each lead wire 14 has an outside diameter of 0.15 mm, and the covering layer 24, if any, has a thickness of 5 μm. The platinum-based adhesive 16 were prepared from a platinum paste consisting of 60 volume % of platinum and 40 volume % of glass.

Each specimen of the thus obtained resistor element was measured in respect of the bonding strength between the lead wires and adhesive masses, a time required for starting its detecting operation, and the temperature of the element upon application of an electric power. The bonding strength was measured as a force which pulled the lead wires out of the adhesive masses.

TABLE 1

| No. | Lead wire Wire rod | Lead wire Covering layer*1 | Pulling force on Lead wire (gf)*2 | Operation starting time (ms)*3 | Temperature of Element (°C.)*4 |
|---|---|---|---|---|---|
| 1 | Pt | — | 620*5 | 270 | 175 |
| 2 | 40Ni—Fe | — | 810*6 | 162 | 245 |
| 3 | 40Ni—Fe | Pt | 1100 | 219 | 219 |
| 4 | 40Ni—Fe | Pt—Pd | 1080 | 168 | 241 |
| 5 | 40Ni—Fe | Pt—Ir | 1110 | 171 | 240 |
| 6 | 40Ni—Fe | Pt—Rh | 1130 | 169 | 239 |
| 7 | SUS 430 | Pt—Pd | 1230 | 163 | 246 |
| 8 | SUS 430 | Pt—Ir | 1190 | 159 | 245 |
| 9 | SUS 430 | Pt—Rh | 1210 | 162 | 243 |

*1 Alloy used for the covering layer consists of 90 wt % of Pt and 10 wt % of the other component.
*2 Average force, where n = 10, which pulled the lead wires out of the adhesive masses
*3 Average time where n = 5
*4 Average temperature. where n = 5, of resistor element upon application of 165 mW
*5 Force which cut off the lead wires
*6 Measurements varied over a large range of 500 gf–1000 gf.

The results of the test are indicated in TABLE 1.

It will be understood from the above TABLE 1 that where the lead wires are formed solely of platinum (No. 1) or include covering layers formed of Pt (No. 3), the heat generated by the resistor element escapes through the lead wires to the outside, resulting in a lowered temperature of the element upon application of an electric power thereto, and a prolonged time for starting its detecting operation. Where the lead wires are formed solely of 40Ni-Fe alloy (No. 2), on the other hand, the adhesion between the lead wires and the adhesives prepared from the platinum paste is deteriorated, whereby the force for pulling out the lead wires is varied over a large range of 500–1000gf though the pulling force desirable in practical use is at least 1000gf.

In the specimens No. 4 through No. 9 with the lead wires having relatively low thermal conductivity, the heat escape through the lead wires is effectively reduced, assuring a relatively high temperature of the element upon application of an electric power, and a shortened time for starting its detecting operation. Further, the lead wires of these specimens are less likely to be pulled out of the adhesives, due to significantly increased bonding strength between the lead wires and the adhesives.

What is claimed is:

1. A thermal flowmeter containing a resistor element for determining a parameter, comprising:
    a ceramic support;
    an electrically resistive body formed on said ceramic support;
    at least one lead wire electrically connected to said electrically resistive body, each of said at least one lead wire comprising a wire rod having a lower thermal conductivity than platinum, and a covering layer which covers said wire rod, said covering layer being formed of an alloy including platinum as a major component and having a lower thermal conductivity than platinum; and
    an adhesive containing platinum, for securing said at least one lead wire to said ceramic support.

2. A thermal flowmeter according to claim 1, wherein the thermal conductivity of said wire rod is not higher than one-third of that of platinum.

3. A thermal flowmeter claim 1, wherein said wire rod is formed of an alloy which is selected from the group consisting of nichrome, tin bronze, Ni-Cu alloy, Fe-Ni-C-Cr alloy, stainless steel and Ni-Fe alloy.

4. A thermal flowmeter according to claim 1, wherein said alloy forming said covering layer further includes a noble metal in addition to platinum as the major component.

5. A thermal flowmeter according to claim 4, wherein said noble metal is selected from elements of the platinum group which include ruthenium, rhodium, palladium, osmium and iridium.

6. A thermal flowmeter according to claim 4, wherein the content of said noble metal in said alloy is within a range of 1–30% by weight.

7. A thermal flowmeter according to claim 1, wherein said covering layer has a thickness of 0.1–50 μm.

8. A thermal flowmeter according to claim 1, wherein said adhesive further contains a glass as a bonding material.

9. A thermal flowmeter according to claim 8, wherein said glass is a crystallized glass.

10. A thermal flowmeter according to claim 9, wherein said crystallized glass includes $ZnO \cdot B_2O_3 \cdot SiO_3$.

11. A thermal flowmeter according to claim 1, wherein said at least one lead wire is electrically connected to said electrically resistive body through said adhesive.

12. A resistor element according to claim 1, further comprising a protective coating covering at least said ceramic support and said electrically resistive body.

13. A resistor element according to claim 12, wherein said protective coating is made of a glass.

14. A resistor element according to claim 1, wherein said electrically resistive body consists of a platinum layer formed by patterning a platinum thin film to provide a predetermined resistance.

* * * * *